(12) United States Patent
Grenie et al.

(10) Patent No.: US 9,945,973 B2
(45) Date of Patent: Apr. 17, 2018

(54) MARINE SEISMIC SURVEY PRE-PLOT DESIGN

(71) Applicant: CGG SERVICES SA, Massy (FR)

(72) Inventors: Damien Grenie, Limours (FR); Risto Siliqi, Paris (FR); Julie Svay, Guyancourt (FR); Keith Wilhelm, Houston, TX (US)

(73) Assignee: CGG SERVICES SAS, Massy (FR)

( * ) Notice: Subject to any disclaimer, the term of this patent is extended or adjusted under 35 U.S.C. 154(b) by 112 days.

(21) Appl. No.: 15/202,079

(22) Filed: Jul. 5, 2016

(65) Prior Publication Data

US 2017/0090055 A1    Mar. 30, 2017

Related U.S. Application Data

(60) Provisional application No. 62/189,222, filed on Jul. 7, 2015.

(51) Int. Cl.
   *G01V 1/38* (2006.01)
   *G05D 1/02* (2006.01)
   *B63B 21/56* (2006.01)

(52) U.S. Cl.
   CPC ............ *G01V 1/3808* (2013.01); *B63B 21/56* (2013.01); *G05D 1/0206* (2013.01); *B63B 2211/02* (2013.01)

(58) Field of Classification Search
   CPC ... G01V 1/3808; B63B 21/56; B63B 2211/02; G05D 1/0206
   USPC .......................................................... 367/15
   See application file for complete search history.

(56) References Cited

U.S. PATENT DOCUMENTS

| 8,547,785 B2 | 10/2013 | Sørli |
| 8,711,654 B2 | 4/2014 | Moldoveanu et al. |
| 8,760,964 B2 | 6/2014 | Moldoveanu et al. |
| 8,949,030 B2 | 2/2015 | Ferber |
| 2007/0165486 A1 | 7/2007 | Moldoveanu et al. |
| 2008/0285381 A1 | 11/2008 | Moldoveanu et al. |
| 2009/0122640 A1 | 5/2009 | Hill et al. |
| 2010/0265793 A1 | 10/2010 | Fleure et al. |
| 2013/0028045 A1 | 1/2013 | Ferber |
| 2013/0107663 A1 | 5/2013 | Moldoveanu et al. |
| 2013/0188448 A1 | 7/2013 | Siliqui et al. |

(Continued)

FOREIGN PATENT DOCUMENTS

WO    2011/080571 A2    7/2011

OTHER PUBLICATIONS

Extended European Search Report in corresponding European Application No. EP 16 30 5845 dated Feb. 27, 2017.

(Continued)

*Primary Examiner* — Daniel L Murphy
(74) *Attorney, Agent, or Firm* — Patent Portfolio Builders PLLC

(57) ABSTRACT

Method and system for generating a full acquisition path for a marine seismic acquisition system. The method includes receiving survey area information about a survey area to be seismically surveyed; selecting a radius (R) and a length (L) of a lace; selecting an overlap distance (OL) between first and second lanes; generating the full acquisition path by repeating the lace along a first lead line inside the first lane and along a second lead line inside the second lane and replicating the first and second lanes until the entire survey area is covered with laces; and sending the full acquisition path to a streamer vessel for performing the seismic survey.

20 Claims, 17 Drawing Sheets

(56) References Cited

U.S. PATENT DOCUMENTS

2014/0121977 A1    5/2014  Lecocq
2016/0170061 A1    6/2016  Grenie et al.

OTHER PUBLICATIONS

C.P. Ashton et al. "3D Seismic Survey Design", Oilfield Review Journal, Apr. 1994, pp. 19-32, Schlumberger.
M. Buia et al., "Shooting Seismic Surveys in Circles", Oilfield Review Journal, Autumn 2008, pp. 18-31, Schlumberger.

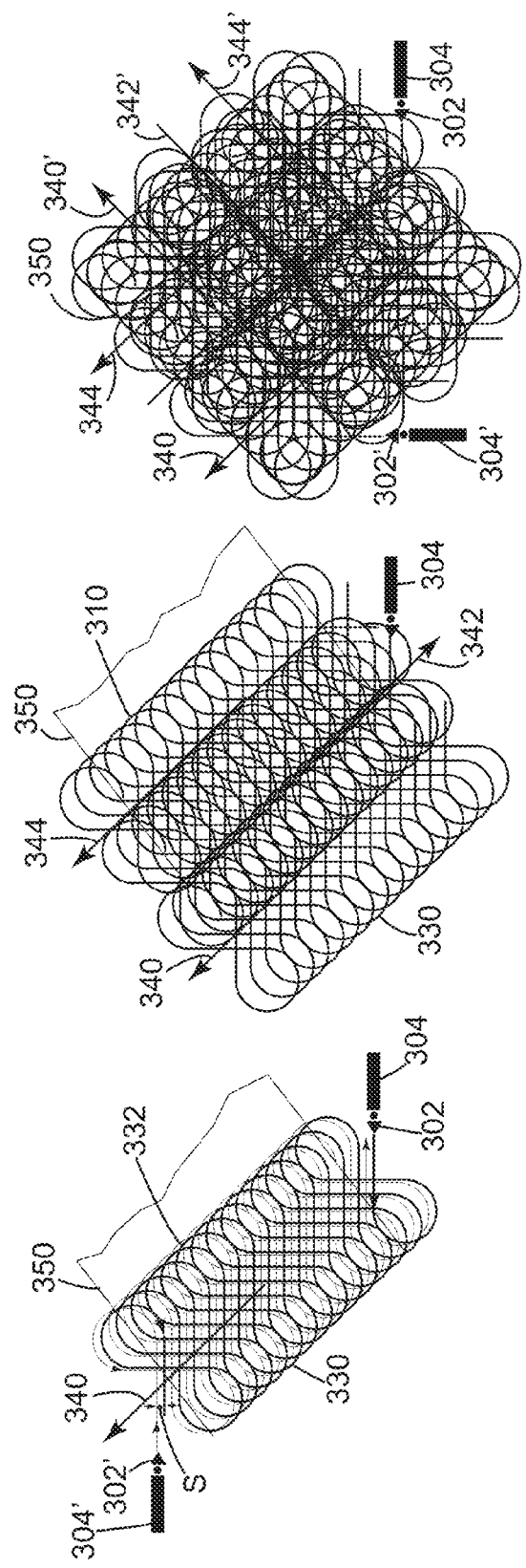

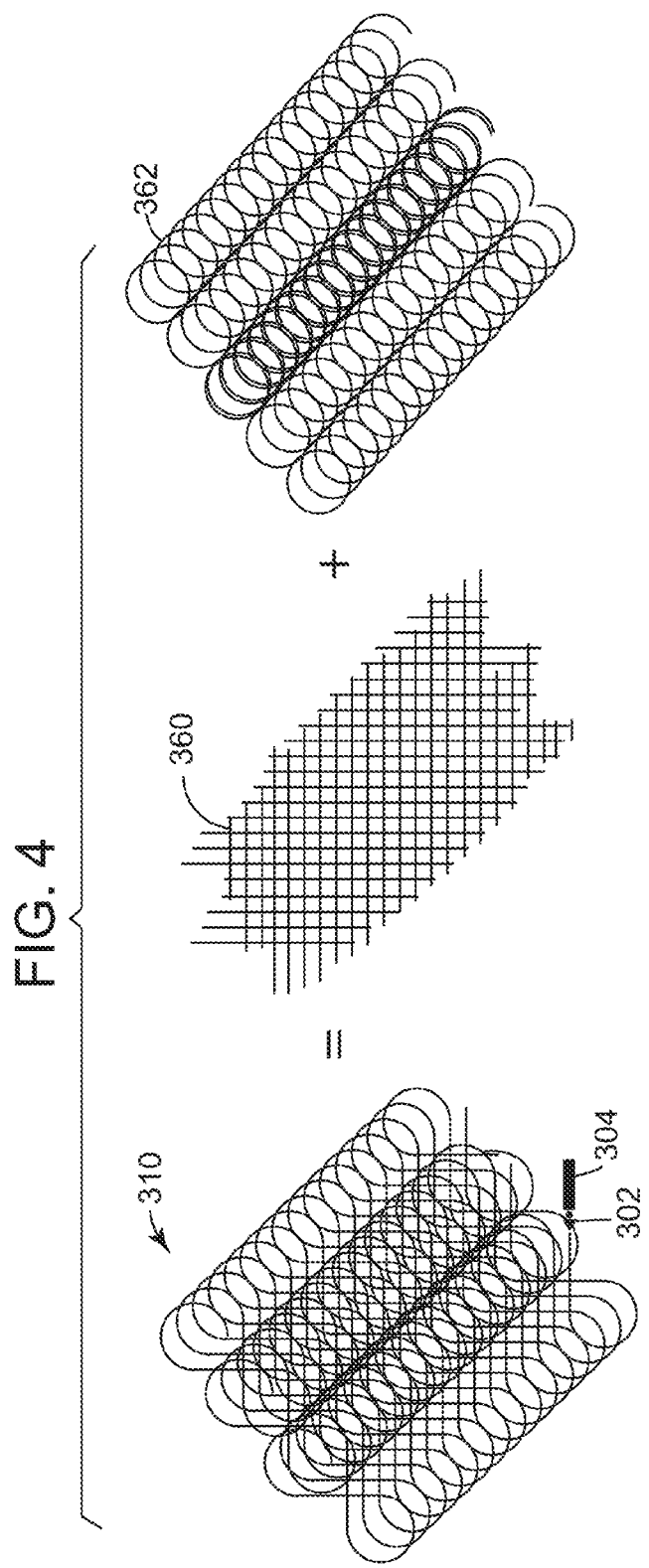

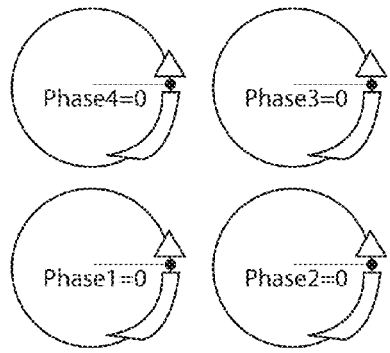 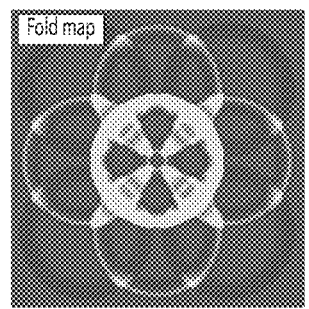 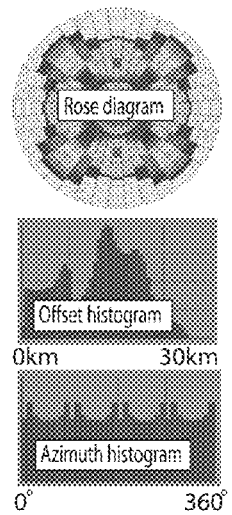
FIG. 9A    FIG. 9B    FIG. 9C
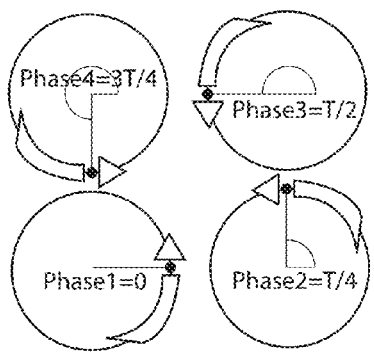 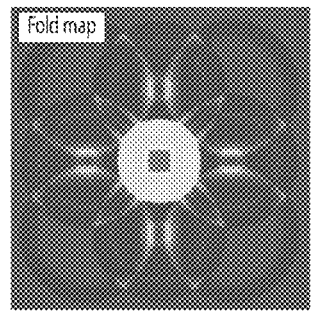 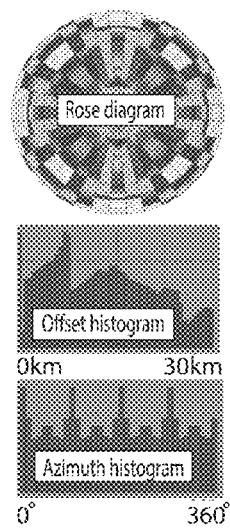
FIG. 10A    FIG. 10B    FIG. 10C

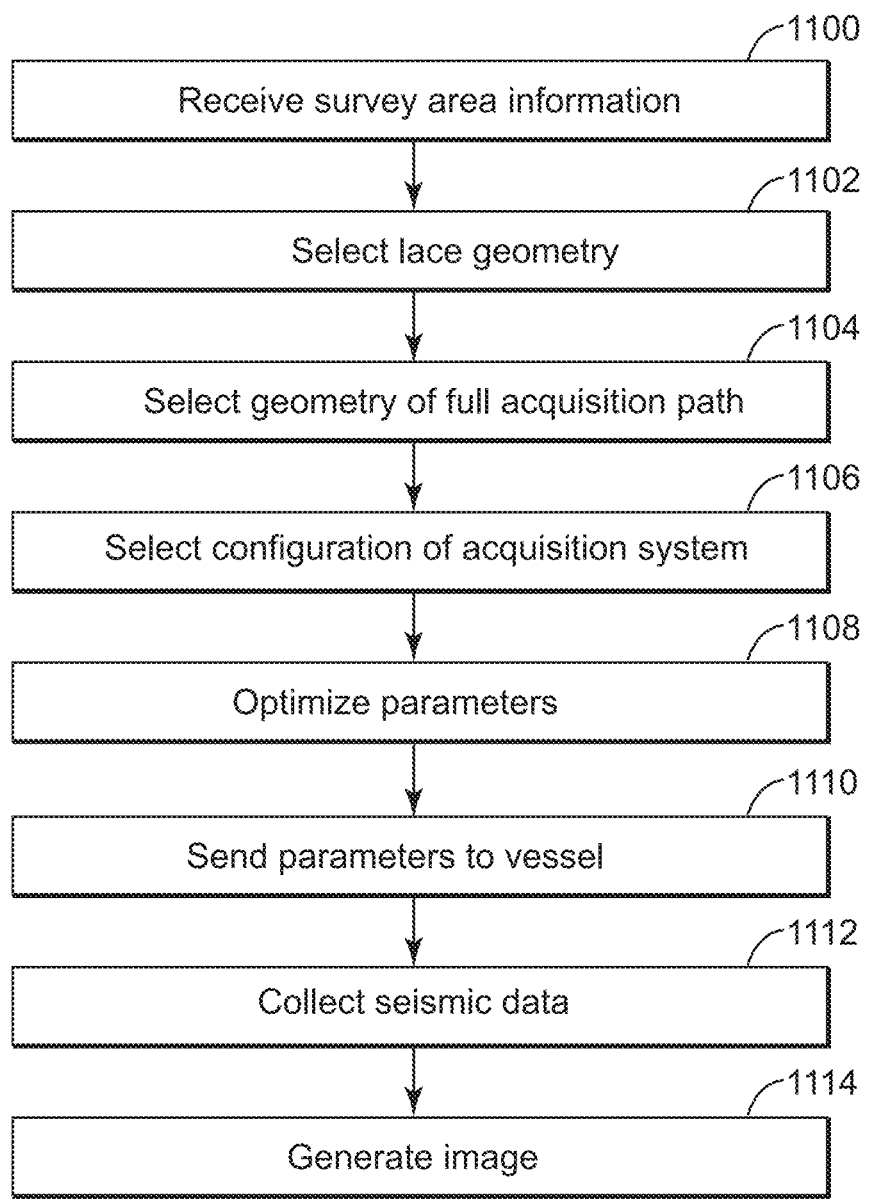

MARINE SEISMIC SURVEY PRE-PLOT DESIGN

CROSS REFERENCE TO RELATED APPLICATIONS

The present application claims the benefit of priority under 35 U.S.C. § 119(e) to U.S. Provisional Application No. 62/189,222, filed on Jul. 7, 2015, the entire contents being incorporated by reference into the present application.

TECHNICAL FIELD

Embodiments of the subject matter disclosed herein generally relate to methods and systems for marine seismic data acquisition and, more particularly, to mechanisms and techniques for designing a seismic survey with improved illumination.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. In other words, such an image of the subsurface is a necessary tool today for those drilling exploration wells for minimizing the potential of finding a dry well. Thus, providing a better image of the subsurface is an ongoing process.

For a traditional, narrow azimuth seismic gathering process, as shown in FIG. 1, a marine seismic data acquisition system 100 includes a survey vessel 102 towing a plurality of streamers 104 (one shown) that may extend over kilometers behind the vessel. One or more source arrays 106 (or simply "source") may also be towed by the survey vessel 102 or another survey vessel (not shown) for generating seismic waves 108. Conventionally, the source arrays 106 are placed in front of the streamers 104, considering a traveling direction of the survey vessel 102. The seismic waves 108 generated by the source arrays 106 propagate downward and penetrate the seafloor 110, eventually being reflected by a reflecting structure 112, 114, 116, 118 at an interface between different layers of the subsurface, back to the surface 119. The reflected seismic waves 120 propagate upward and are detected by detectors 122 provided on the streamers 104. This process is generally referred to as "shooting" a particular seafloor 110 area.

One of the shortcomings of existing technology relates to the poor azimuth/offset distribution of the data collection points, i.e., detectors 122, positioned along streamers of equal length, and the number of streamers 104 attached to the survey vessel 102. Generally, a single survey vessel 102 tows approximately ten to sixteen streamers 104, of uniform length, with detectors 122 equally spaced along the length of each streamer. In this configuration, the azimuth of the collection points is narrow. The azimuth is defined as the angle made between a line that passes through the source and a recording receiver and the navigation path when viewed from above the source and the recording receiver. Narrow azimuth distribution (NAZ), which is typical for a single vessel seismic survey, leads to problems associated with multiple (reflective) removals at locations on the streamers in close proximity to the source arrays 106.

Another shortcoming associated with existing NAZ acquisition methods relates to the collected data in relation to its intended use, i.e., different streamer collection configurations lend themselves to different uses of the data, such as multiple removal, imaging and model building. Narrow azimuth distribution streamer configurations are not focused on a specific use of the collected data, resulting in less than optimal seismic image results.

To achieve a good image of the surveyed subsurface, an ideal set of seismic data will provide complete and uniform illumination of the subsurface. Uniform illumination requires that each point in the subsurface is represented by a fold of data that corresponds to a uniform distribution of source-receiver offsets and a uniform distribution of source-receiver azimuths. As illustrated in FIG. 2A, a typical NAZ system that includes only a vessel 202, a source 206 and a set of streamers 204, is able to collect seismic data having a single azimuth and limited source-receiver offsets. An improvement to the NAZ system is illustrated in FIG. 2B, and it includes a plurality of NAZ systems (only three are shown in the figure). This system is known in the art as multi-azimuth (MAZ) system. This system achieves a better azimuth distribution as the vessel 202 generates, for the same subsurface point, multiple azimuths.

Another improvement of the NAZ system is illustrated in FIG. 2C, and includes two more vessels 202' and 202" that tow corresponding sources 206' and 206", where these additional vessels advances on lines parallel to the vessel 202's path, thus achieving better source-receiver offset and better azimuth. This system is known in the art as a wide-azimuth WAZ system.

Still another improvement, developed by the assignee of this application, is illustrated in FIG. 2D (which corresponds to FIG. 4 of U.S. patent application Ser. No. 14/902,926, the entire content of which is incorporated by reference herein). This system, called StagSeis, includes two streamer vessels 202 and 204 and three source vessels 206, 208 and 210. The streamer vessels 202 and 204 are towing corresponding streamer spreads 202B and 204B, and optionally, one or more seismic source arrays 202A and 204A. A source array may include one or more sub-arrays and a sub-array may include one or more source elements. A source element may be an air gun, a vibratory element, etc. A streamer vessel necessarily tows a streamer spread while a source vessel necessarily tows a source array. However, it is possible that the streamer vessel also tows a source array, as illustrated in FIG. 2D. In this StagSeis configuration, the sources are staggered both along the inline direction X and the cross-line direction Y. The StagSeis configuration may have the sources distributed along a curved line 220. In one application, line 220 is a straight line, slanted or not relative to the advancing path of the vessels.

Still another configuration used in the industry for improving the azimuth distribution is the Coil configuration, which is illustrated in FIG. 2E. According to this configuration, vessel 202 follows an almost circular path (i.e., a coil).

However, although the above noted systems improve the source-receiver offset and azimuth distributions, there is still a need for collecting data with even better distributions for further improving the accuracy of the image of the surveyed subsurface (which is obtained by processing the acquired seismic data). Accordingly, it would be desirable to provide systems and methods that further improve the azimuth distribution and/or the source-receiver offset distribution for a marine seismic acquisition system to improve an accuracy of the subsurface's image.

SUMMARY

According to an embodiment, there is a method for generating a full acquisition path for a marine seismic acquisition system. The method includes receiving survey area information about a survey area (350) to be seismically surveyed; selecting a radius (R) and a length (L) of a lace; selecting an overlap distance (OL) between first and second lanes; generating the full acquisition path by repeating the lace along a first lead line inside the first lane and along a second lead line inside the second lane and replicating the first and second lanes until the entire survey area is covered with laces; and sending the full acquisition path to a streamer vessel for performing the seismic survey.

According to another embodiment, there is a marine acquisition system for collecting seismic data. The system includes a first streamer vessel; a source towed by the first streamer vessel and configured to generate seismic waves; a streamer spread towed by the first streamer vessel and configured to collect the seismic data generated by the seismic waves; and a navigation system located on the first streamer vessel and configured to control the first streamer vessel to follow a first full acquisition path over a survey area. The first full acquisition path includes plural laces connected to each other, each lace being defined by a radius (R) and a length (L).

According to still another embodiment, there is a method for generating a full acquisition path for a seismic survey. The method includes receiving characteristics of a survey area to be survey; and generating the full acquisition path by replicating a lace along overlapping lanes, where the overlapping lanes cover the entire survey area. The full acquisition path includes a set of straight lines and a set of coils.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3A-3F illustrate a new pre-plot configuration that uses laces and lanes for covering a survey area;

FIG. 4 illustrates how a pre-plot configuration that includes laces is similar to a superposition of one survey that includes straight lines and one survey that includes coils;

FIGS. 9A-9C illustrate various characteristics for a multi-vessel seismic survey having the same phases;

FIGS. 10A-10C illustrate the same various characteristics for the same multi-vessel seismic survey having different phases;

FIG. 11 is a flow-chart of a method for generating a pre-plot for a seismic survey;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a single streamer vessel. However, the embodiments to be discussed next are not limited to this configuration, but may be extended to other arrangements that include more or fewer streamer vessels and/or source vessels. Also, the figures may show a particular order of the streamer and source vessels along inline and cross-line directions. This order is exemplary and not intended to limit the embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a new marine seismic survey design (called herein oxoSeis configuration) includes curved and straight lines (known in the art as pre-plot lines) to be followed by at least a streamer vessel when acquiring the seismic data over a given survey area. The path geometry evolves in space and in time, by generating specific path patterns (e.g., a lace) that eventually cover the entire survey area. Full coverage of the survey area may be achieved by overlapping the path patterns along different directions. The oxoSeis configuration performs in one go both the MAZ and the Coil surveys, with their advantages. Thus, the oxoSeis configuration, as discussed next, will substantially achieve the source-receiver offsets distribution and/or the azimuth distribution that a MAZ survey and a Coil survey would achieve if used sequentially over a same survey area.

Figure 1:
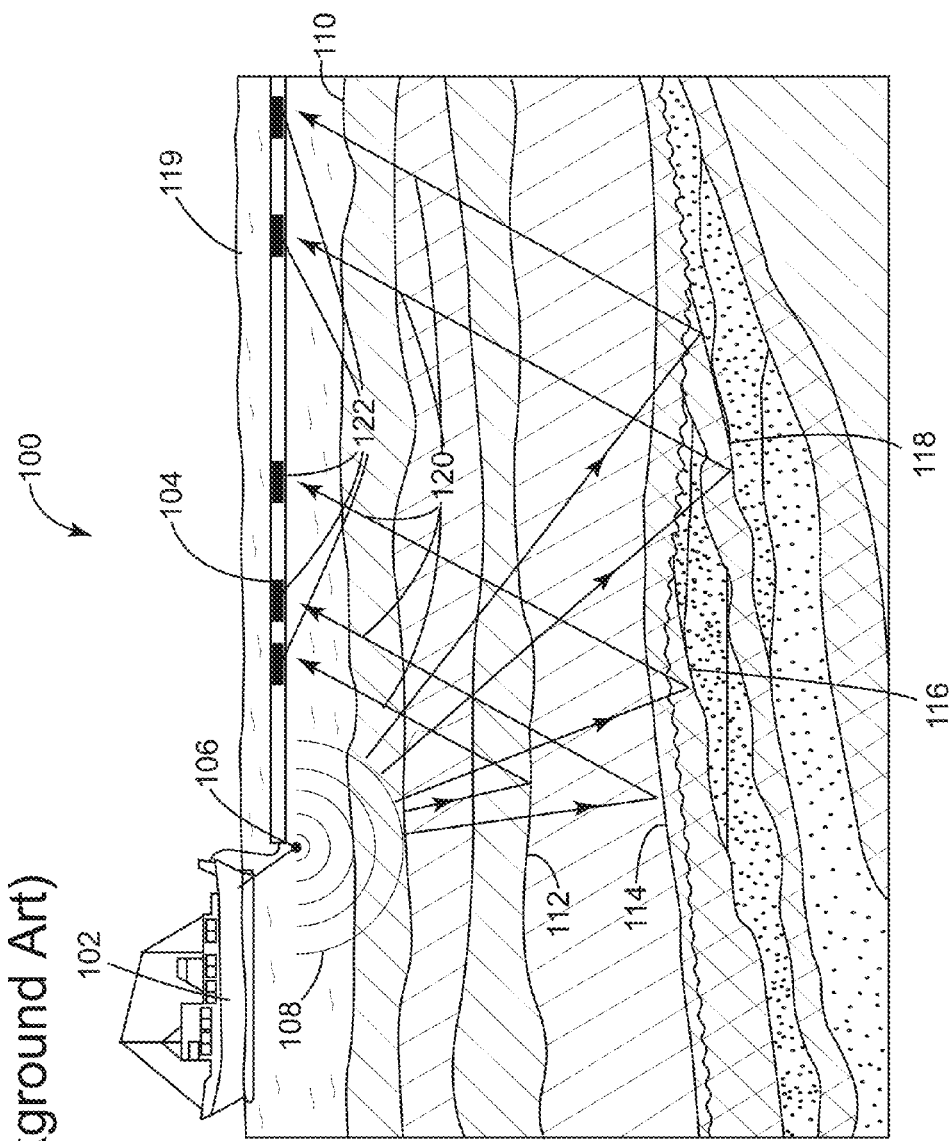
FIG. 1 is a schematic illustration of a traditional marine seismic data acquisition system.
Figure 2A:
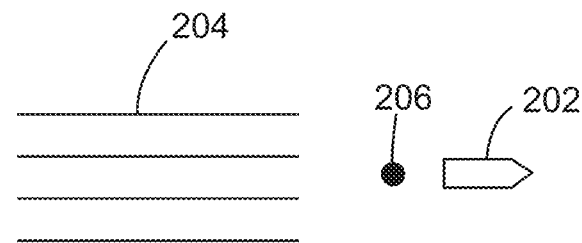
FIG. 2A illustrates a narrow azimuth marine seismic data acquisition system.
Figure 2B:
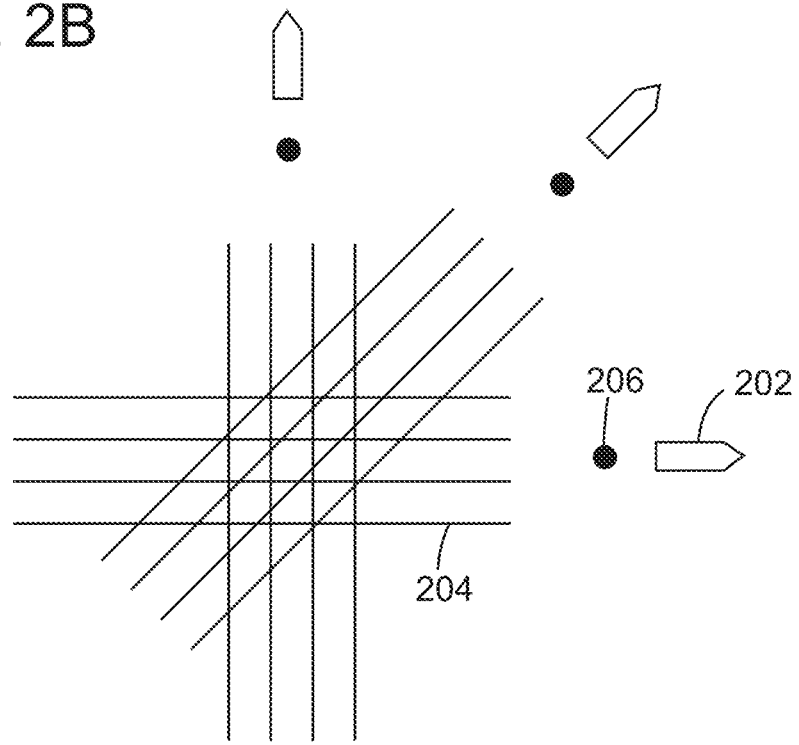
FIG. 2B illustrates a multi-azimuth system.
Figure 2C:
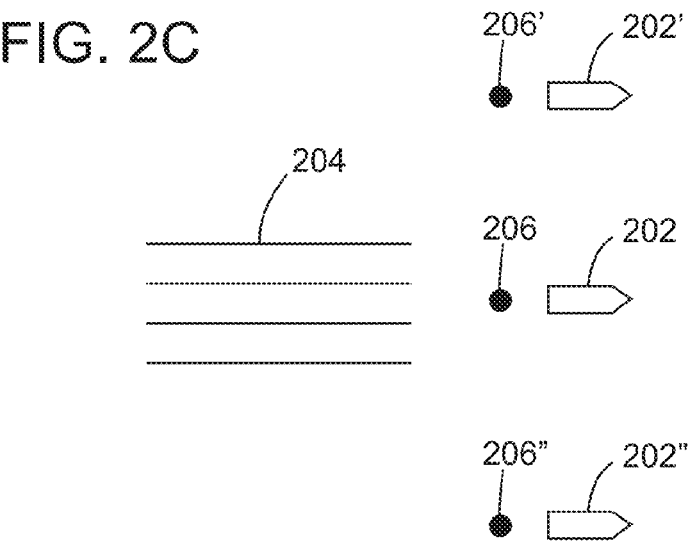
FIG. 2C illustrates a wide-azimuth system.
Figure 2E:
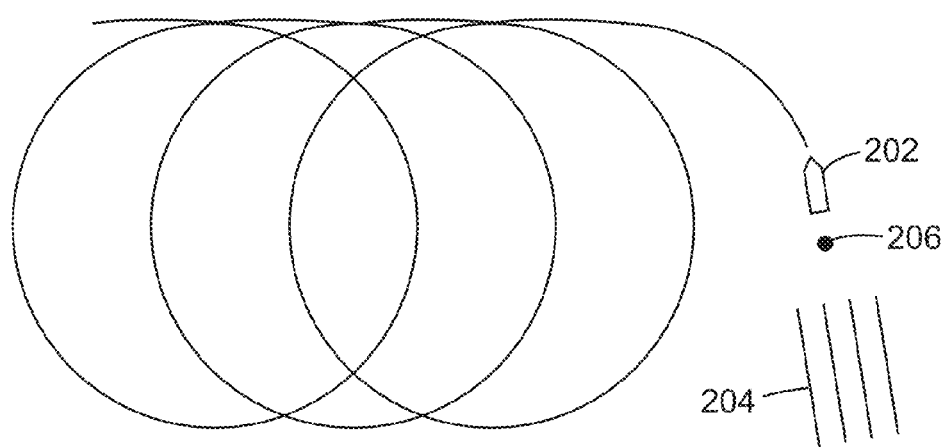
FIG. 2E illustrates a coil system.
Figure 2D:
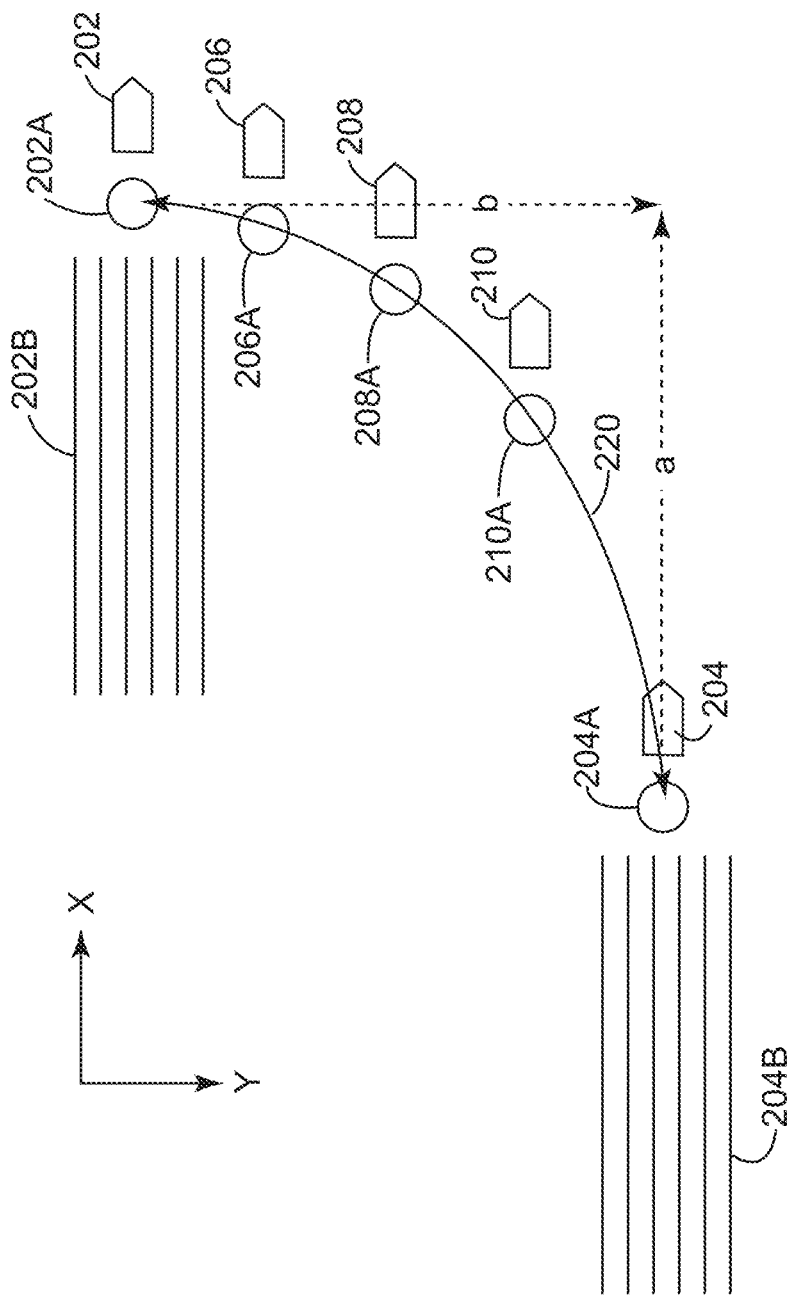
FIG. 2D illustrates a staggered system.
Figure 3A:
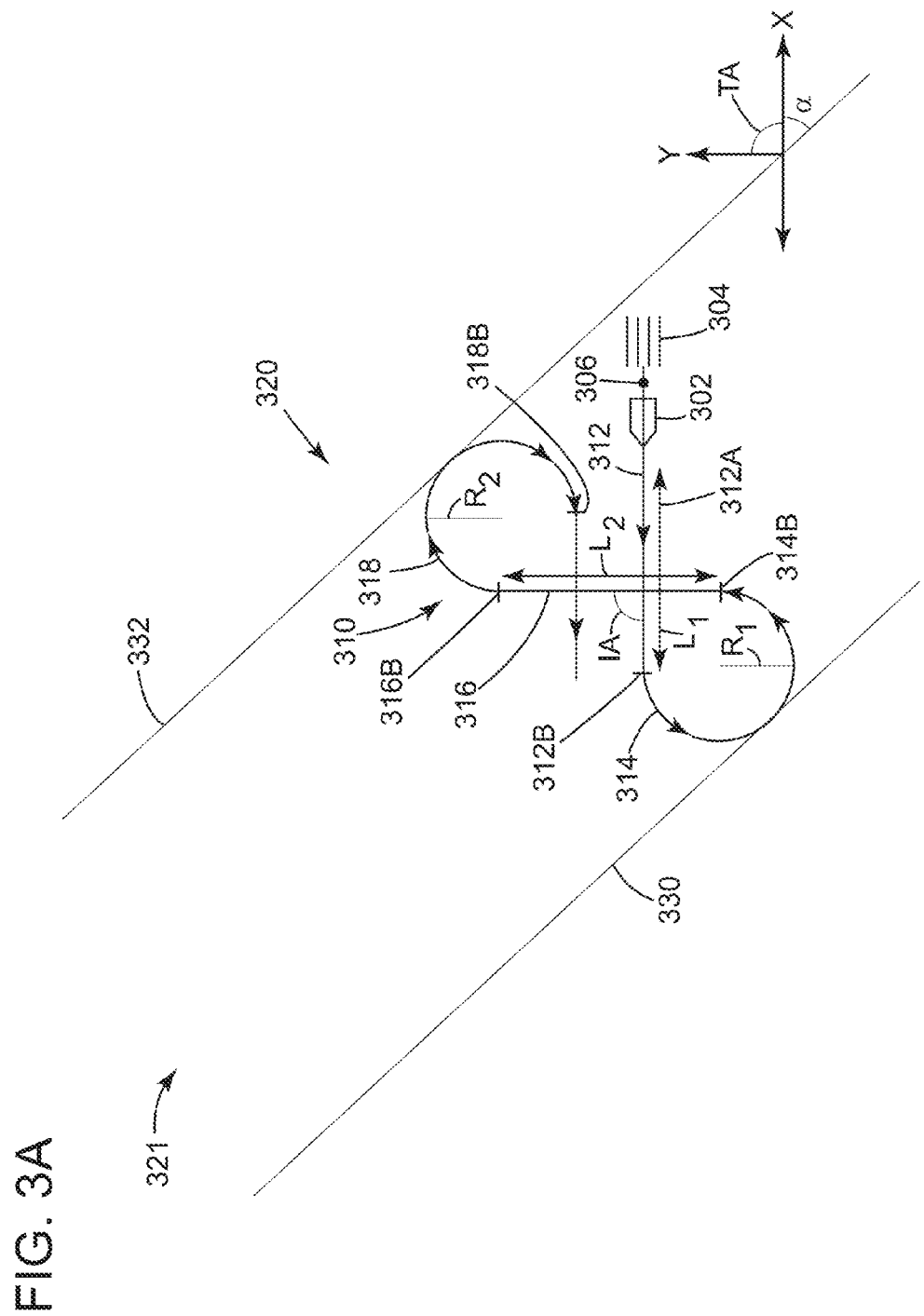

One possible oxoSeis configuration is now discussed with regard to FIGS. 3A-3F. FIG. 3A shows a single streamer vessel 302 that tows a source array 306 and a seismic spread 304. Source array 306 may include plural sub-arrays, each sub-array including plural source elements. A source element may be an air gun, a vibratory source, etc. The seismic spread may include one or more streamers, each streamer including at least one seismic sensor. A seismic sensor may be a hydrophone, geophone, accelerometer, optical fiber, etc. One or more streamers may be multi-component streamers, i.e., they may include two or more different seismic sensors.

Vessel 302 follows a full acquisition path 310 (the figure shows only a short part of path 310 for clarity; the full acquisition path is shown later in its entirety) that is characterized by a number of portions and/or parameters. A first parameter is the travel angle (TA) relative to a fixed reference system XY, as illustrated in FIG. 3A. For example, FIG. 3A shows that first path portion 312 of path 310 makes a 180° (or zero) angle with axis X of the reference system. This angle can be different from 180 or zero. First path portion 312 is a straight line and has a length L1 and the first path portion extends from connecting points 312A to 312B.

Following it, the vessel enters a second path portion 314, which is part of a circle. In other words, second path portion 314 has a radius R1. However, second path portion 314 is not a full circle. In one embodiment, the shape of the second path portion is part of an ellipse or parabola, i.e., it is a curved path. Second path portion 314 extends from connecting point 312B to connecting point 314B. At connecting point 314B, vessel 302 follows a third path portion 316, which is again a straight line path. The length of the third path portion 316 is L2. The third path portion 316 extends from connecting point 314B to connecting point 316B. At connecting point 316B, vessel 302 follows a fourth path portion 318, which is again a curved path. In the embodiment shown in FIG. 3A, fourth path portion 318 is part of a circle having a radius R2 and extends from connecting point 316B to connecting point 318B.

This pattern (first to fourth path portions) shown in FIG. 3A, which is called a "lace" herein, includes two straight line portions 312 and 316 (substantially perpendicular to each other; however, one skilled in the art would understand that the two straight line portions may have an intersection angle (IA) different from 90°) and two curved portions 314 and 318, connected to each other to form a single path 310. Lace 320 is thus characterized by two radiuses R1 and R2, two lengths L1 and L2 and intersection angle IA. In a more specific case, if the two radiuses are identical, i.e., R1=R2=R and the two lengths are the same, i.e., L1=L2=L, the lace is characterized by a radius R and a length L. Lace 320 is the basic pattern that is repeated over the entire survey area as discussed next. Lace 320 extends between two parallel lane lines 330 and 332 that define a lane 321. As will be discussed later, the vessel is instructed to follow lace 320 and then repeat it along lane 321 until the entire lane is covered. Then, as also discussed later, a next lane 321' is covered by the vessel with the same lace 320 or a different lace 322 as illustrated in FIG. 3F. This process continues until the entire survey area is covered by lanes 321, 321', etc. The parallel lines 330 and 332 may form a given lane angle α with axis X of the fixed reference system XY. This angle can have any desired value for a given survey. As noted above, lengths L1 and L2 may be identical or different. These lengths may have a value between a few km to tens if not hundreds of kms. Radiuses R1 and R2 may have the same value or different values. These radiuses may have a value between a few hundreds of meters to a few km, depending on the length of the streamers.

Figure 3B:
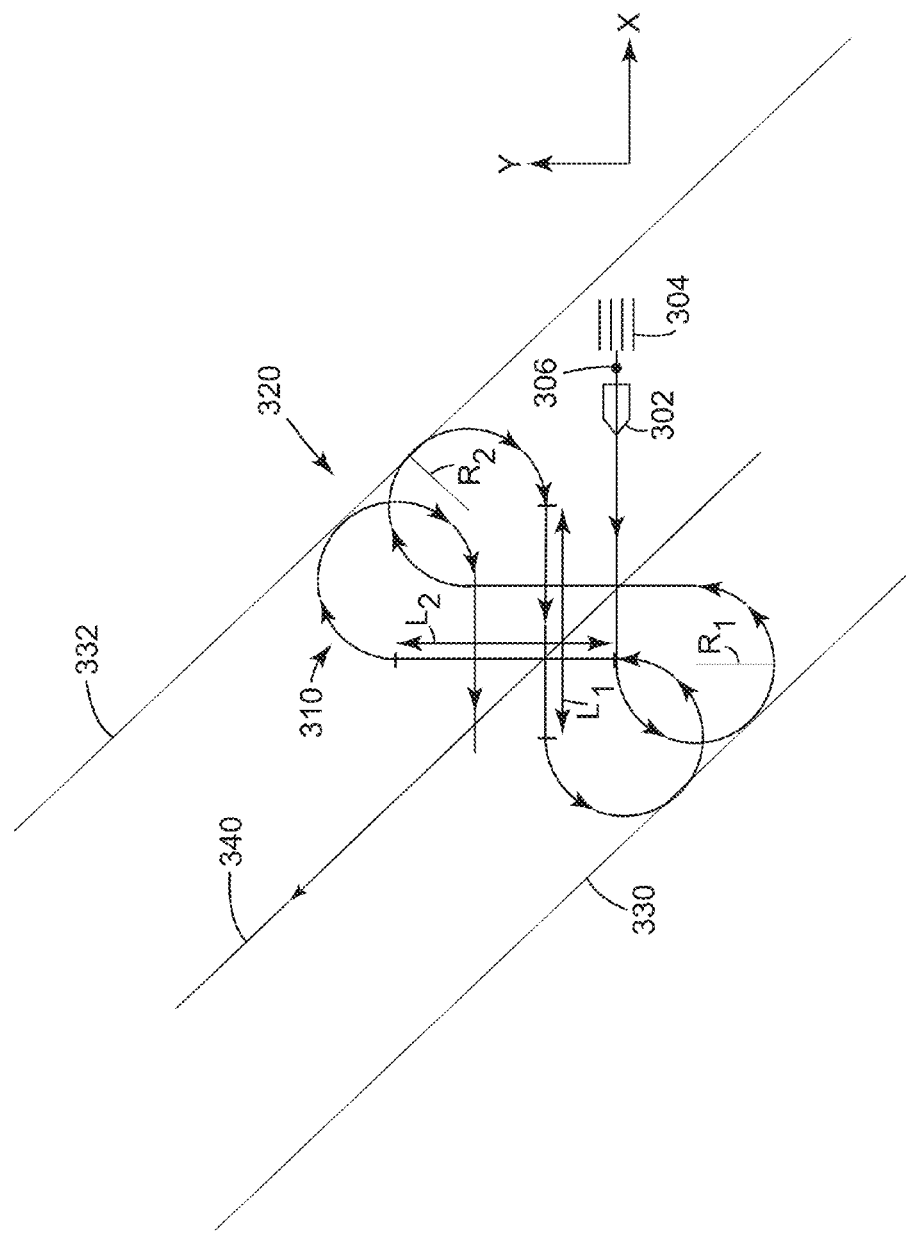
Figure 3F:
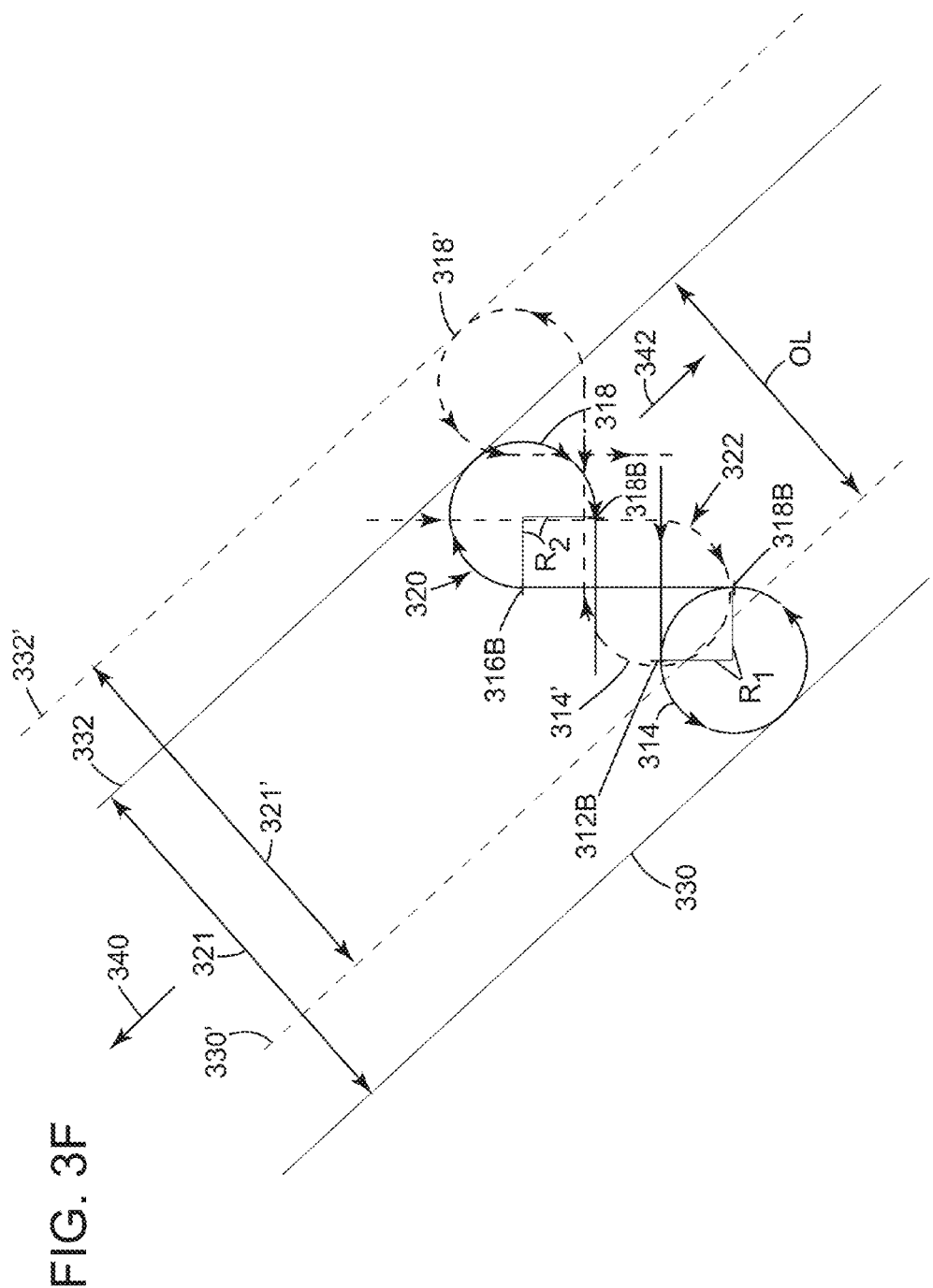

If lace 320 is extended (i.e., repeated) along a first lead line 340, as shown in FIG. 3B, the lace pattern (which includes plural identical laces connected to each other) will cover the entire lane bordered by lane lines 320 and 330. First lead line 340 may be a straight line that extends parallel to lane lines 330 and 332. FIG. 3C shows the lace 320 repeated along first lead line 340 until a border of the survey area 350 is reached while FIG. 3D shows the lace 320 being repeated along a second lead line 342, which is opposite in direction and substantially parallel to the first lead line 340. FIG. 3C also shows lace 320 being repeated along first lead line 340, in an opposite direction, by vessel 302'. In one embodiment, as illustrated in FIG. 3C, vessel 302' and vessel 302 follow different paths, made of same lace 320, with one vessel moving along the first lead line 340 while the other vessel moves in an opposite direction of the first lead line. In other words, the laces (or the path) followed by vessel 302 are shifted relative to the laces (or the path) followed by vessel 302' by a shift S (see FIG. 3C) so that the two vessels' paths do not coincide. In one application, it is possible that vessel 302' is the same as vessel 302. In another application, if the vessels are different, they can simultaneously follow the paths shown in FIG. 3C. In still another application, the two vessels follow their paths with a time offset. By repeating lace 320 along parallel and alternating lead lines 340, 342, 344 and so on, eventually the entire survey area 350 is covered. Therefore, the full acquisition path 310 includes straight and curved portions as discussed above. Note that full acquisition path 310 is smooth, i.e., the vessel does not have to make any jumps from one path portion to another portion.

FIG. 3E shows the survey area 350 being entirely being covered by lace 320 replicated along substantially parallel lead lines 340, 342, 344, etc. but also covered for a second time, by vessel 302' and spread 304' along substantially parallel lead lines 340', 342', 344', etc., which are rotated by a rotation angle β relative to lead lines 340, 342, 344, etc. In this case, rotation angle β is about 90 degrees. Vessel 302' may be the same as vessel 302 or different. The lace followed by vessel 302' may have the same radius R' and length L' as the lace followed by vessel 302 or different. The full acquisition path of vessel 302' may be identical to path 310 of vessel 302, but rotated with the rotation angle β, or it may be different.

In one embodiment, laces 320 along lead line 340 and laces 322 along lead line 342 may have different relative positions as illustrated in FIG. 3F. For example, FIG. 3F illustrates a single lace 320 and a single lace 322 for simplicity. The two laces partially overlap. The amount of overlap can change from survey to survey or even from one lead line 340 to the next lead line 342. In FIG. 3F, connecting points 312B, 314B, 316B and 318B correspond to connecting portions between the straight line paths 312 and 316 and the curved paths 314 and 318 that form lace 320. The same points may be the connecting points for lace 322, as also illustrated in FIG. 3F. This means that both laces 320 and 322 have a same, single radius R. Further, for the embodiment illustrated in FIG. 3F, the curved paths 314 and 318 are substantially three quarters of a full circle. The straight path portions 312 and 316 have the same length L as the corresponding straight path portions of lace 322.

The amount of overlap between adjacent laces 320 and 322 can be quantified, for example, by the amount OL that separates lane lines 332 and 330'. More specifically, if lane lines 330 and 332 are considered to define the spatial extension of lace 320 (i.e., these two lines define a lane 321 in which lace 320 is repeated from one side to another side of the survey area) and lane lines 330' and 332' are considered to define the spatial extension of lace 322 (i.e., these two lines define another lane 321' in which lace 322 is repeated from the another side to the one side of the survey area), the distance OL defines how much the lanes are overlapped. In the embodiment illustrated in FIG. 3F, the distance OL is between 3R and 4R. However, for another survey, the distance OL may be smaller than 3R or larger than 4R. In one embodiment, lane line 330' passes through connecting points 312B and 314B.

The full acquisition path 310 illustrated in FIG. 3D may be viewed as a superposition of a set of straight and perpendicular lines 360 and a set of coils 362 as illustrated in FIG. 4. This means that such a configuration achieves some or all of the benefits of a NAZ survey (which has a pre-plot similar to lines 360) and a coil survey (which has a pre-plot similar to coils 362).

Figure 5B:
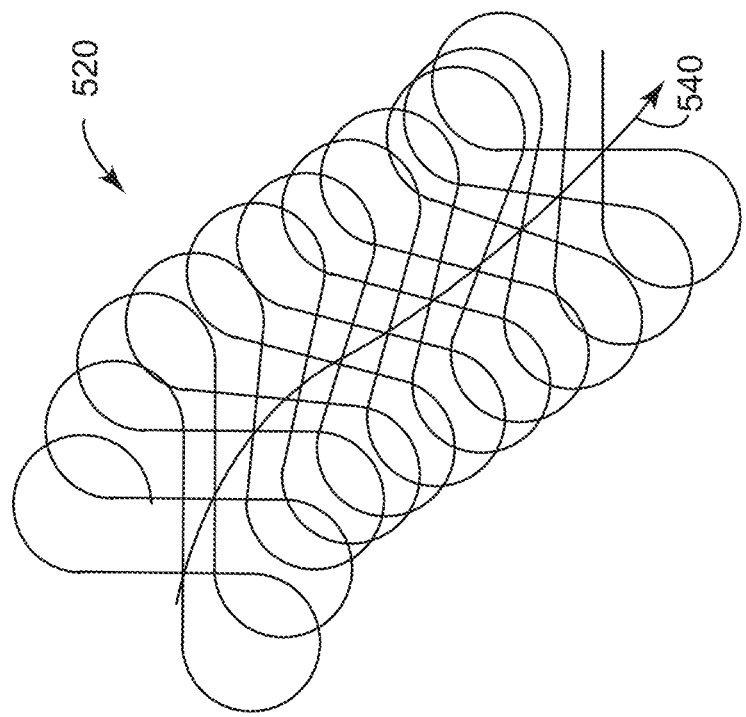
FIGS. 5A and 5B illustrate pre-plot configurations having straight and curved lead lines.
Figure 5A:
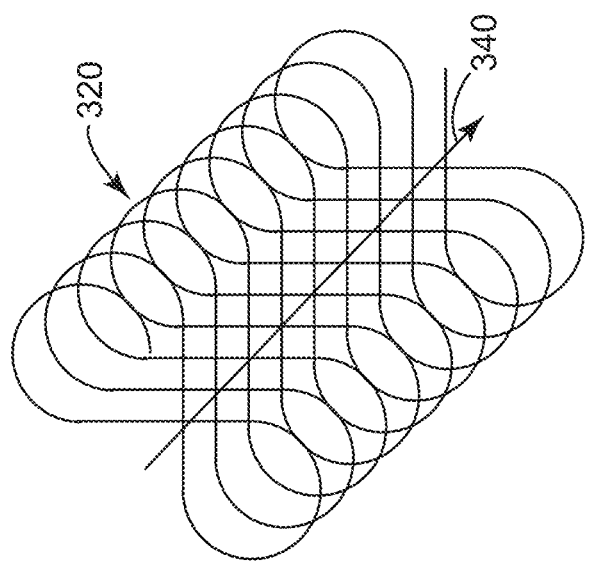

This oxoSeis configuration can be modified to further improve the source-receiver offset distribution and/or the azimuth distribution. For example, it is possible to have lead line 340 (also lead lines 342, 344 and so on), which is shown in FIG. 5A as being a straight line, to be curved, as illustrated by lead line 540 in FIG. 5B. If this is the case, lace 520's orientation changes as the vessel advances along its path.

Figure 6A:
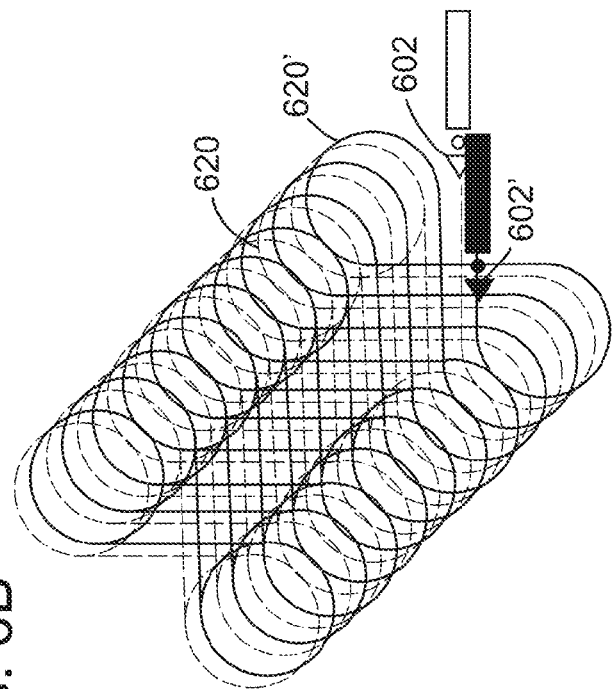
FIGS. 6A and 6B illustrate pre-plot configurations with plural streamer vessels.
Figure 6B:
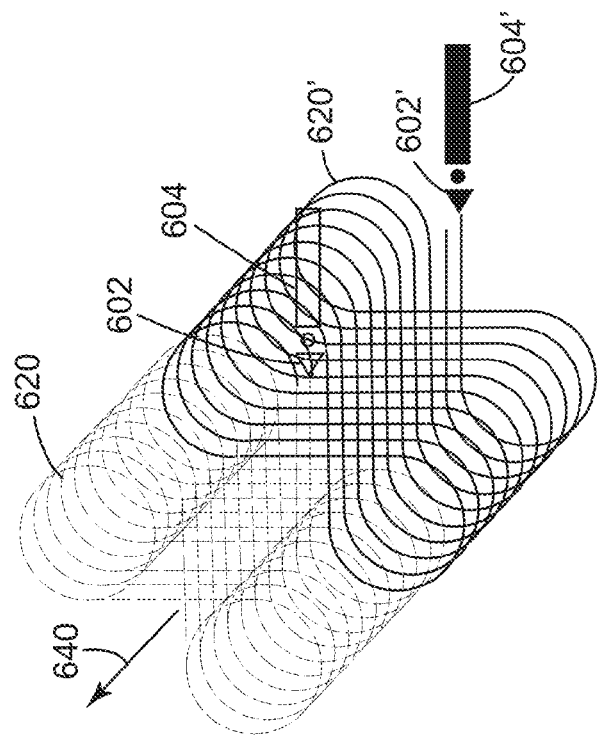

In another embodiment, it is possible to have multiple vessels (the StagSeis configuration) following the laces discussed above and these vessels may shoot simultaneously for increasing the trace density and/or shot density. For example, FIG. 6A shows two streamer vessels 602 and 602' following similar laces 620 and 620', respectively, both laces following a same lead line 640. Laces 620 and 620' are interleaved as illustrated in the figure. One or more source vessels (vessels that tow only sources) may also be present similar to the StagSeis configuration. In still another embodiment, illustrated in FIG. 6B, the two streamer vessels 602 and 602' follow corresponding laces 620 and 620' that are juxtaposed. Again, more than two vessels (e.g., additional streamer and/or source vessels) may be involved in this configuration.

Figure 7A:
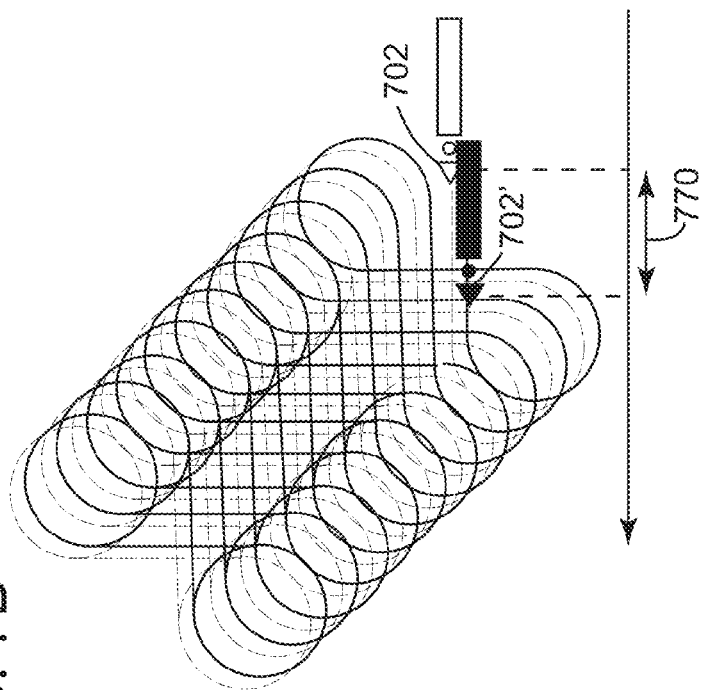
FIGS. 7A and 7B illustrate pre-plot configurations with plural streamer vessels having different phases.
Figure 7B:
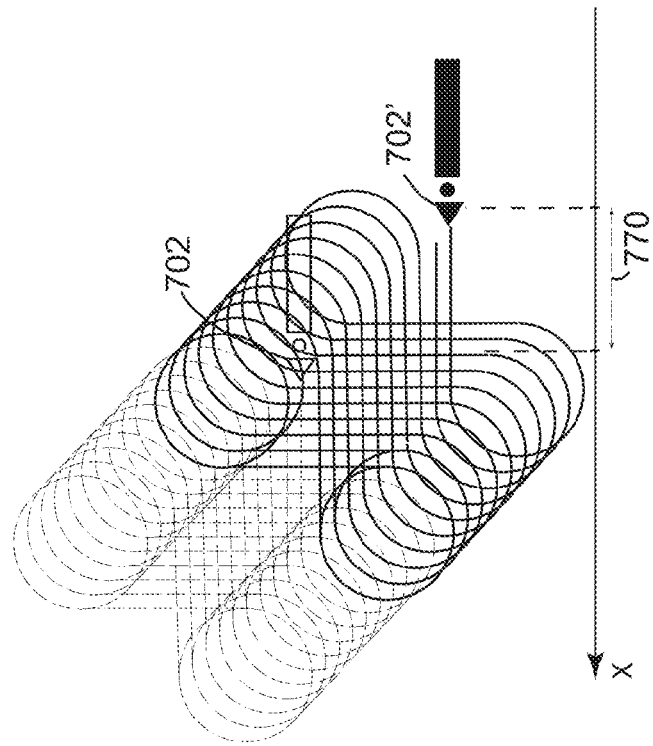
Figure 8B:
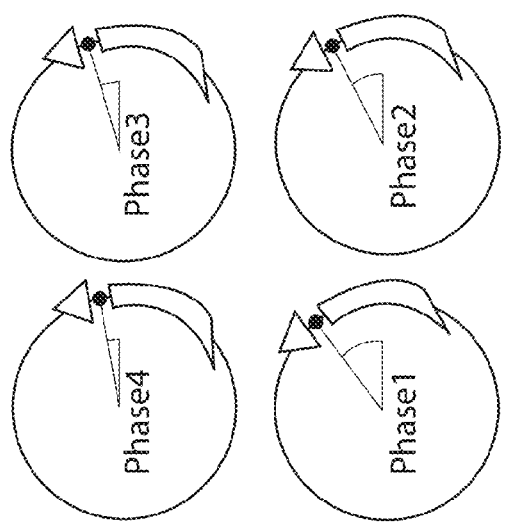
FIGS. 8A and 8B illustrate multi-vessel configurations that follow undulating paths.
Figure 8A:
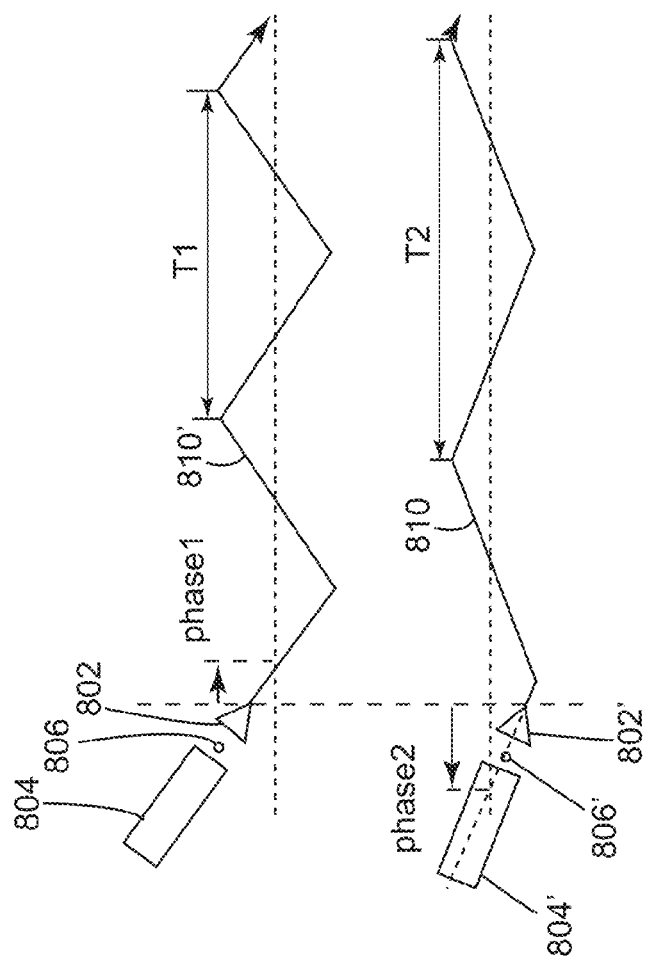

In still another embodiment, as illustrated in FIGS. 7A and 7B, an inline distance 770 between two vessels 702 and 702' (streamer vessels, or source vessels or streamer and source vessels) may be controlled to further optimize the offset and/or azimuth distribution. The inline distance 770 is the equivalent of a phase parameter when a multi-vessel system is used. To exemplify this idea, FIG. 8A shows two vessels 802 and 802' towing corresponding streamers 804 and 804', respectively, and corresponding sources 806 and 806'. The vessels follow undulating paths 810 and 810' (e.g., a sinusoid) that have corresponding periods T1 and T2. The periods may be identical.

A vessel's periodic path as a function of time can be described as $Path_i=f_i(T_i, Phase_i \ldots)$, where the arguments of function $f_i$ correspond to period T, phase Phase and any other parameter describing the path (e.g., amplitude, shift, etc.). The number of vessels is described by index "i," which is 2 for FIG. 8A and 4 for FIG. 8B. FIG. 8B illustrates four vessels that follow circular paths (coil configuration) with different phases. By controlling the $Phase_i$ of each vessel involved in the seismic survey, the offset and/or azimuth distributions can be adjusted.

In this regard, consider the configuration illustrated in FIG. 8B, i.e., four vessels that follow coil paths. If all the vessels have the same phases as illustrated in FIG. 9A (e.g., zero), the corresponding fold map is shown in FIG. 9B, and the rose diagram illustrating the offset and azimuth distributions are illustrated in FIG. 9C. FIG. 10A shows the same four vessels having different phases (e.g., 0, T/4, T/2, 3T/4). FIG. 10B shows the fold map and FIG. 10C shows the rose diagram illustrating the offset and azimuth distributions. Note that both the fold map and the rose diagrams are substantially different from each other in FIGS. 9C and 10C, which suggests that the phase has a large impact on them.

Returning to FIGS. 7A and 7B, by controlling the inline distance 770 between the various vessels as they enter their corresponding lace, which is equivalent to controlling the phase, the corresponding offset and azimuth distributions can be controlled, and thus, the illumination of the surveyed subsurface.

The vessels discussed above may follow straight paths (pre-plot sail lines) or curved paths having amplitudes, periods and phases that may or may not be the same. The amplitudes, periods, and phases for the curved paths may be optimized to obtain better azimuth and offset diversity for the recorded data. However, it is possible that only the streamer vessels follow the curved path and the source vessels follow a straight line path, or the other way around, or any other combination, as long as the azimuth and/or offset distribution of the collected seismic data is improved relative to the existing acquisition systems, see for example, U.S. Patent Application Publication No. 2013/0188448.

Regarding the streamers, it is possible to have various seismic sensors located on the streamer to record the seismic data. For example, the streamers may include hydrophones, geophones, accelerometers, optical fiber, or a combination of them. The streamers may have different lengths and the number of streamers may differ. The streamer spreads may be different or the same.

Regarding the sources, it is conventional to tow a source array that includes three sub-arrays. Each sub-array includes a float to which individual source elements are attached. Thus, all the individual source elements may be located at a same or different depth. It is also possible that each vessel tows two or more source arrays.

A method to design a full acquisition path 310 for one or more of the above discussed embodiments is now discussed with regard to FIG. 11. In step 1100, information about the survey area is received. This information may include the length and width of the survey area, its location, ocean conditions at the survey area (e.g., sound speed in water, presence of ocean currents, water temperature, etc.), and/or survey target geological information (e.g., type of target, presence of salt, etc.). In step 1102, the lace's geometry is selected. For example, the size R of the coils, the length L of the straight lines and the angle between the straight lines may be selected by the survey's operator in this step. This selection is based on the aim of the seismic survey, the required or desired azimuth distribution and/or offset distribution. In step 1104, the geometry of the full acquisition path 310 is selected so that the propagation of the lace 320 along lead lines 340, 342, etc. covers the entire survey area 350. In this step, it is selected whether lead lines 340, 342, . . . are straight lines or curved, if curved, what kind of curve, the length of these lines, the orientation (i.e., travel angle TA) of these lines relative to a fixed system of reference, and also the orientation (i.e., intersection angle IA) of the straight lines relative to each other, as discussed previously with regard to FIG. 3A. Also, in this step the overlap distance OL between two lanes 321 and 321' is selected.

In step 1106, the configuration of the acquisition system, i.e., the number of vessels (streamer and source vessels) to cover the survey area is selected. In this step, the initial direction and azimuth of the vessels may also be selected, as illustrated in FIG. 3E. In one application, the inline distance 770 (or phase) between the vessels and/or whether their laces are juxtaposed or interleaved is selected.

In step 1108, one or more of the above noted parameters may be optimized to adjust the desired offset distribution and/or azimuth distribution. For example, it is possible to calculate an illumination to be obtained with the acquisition system discussed above and to compare it with a baseline illumination that is desirable for the survey area. If the calculated illumination deviates from the baseline illumination by more than a given value, one or more of the parameters noted in steps 1102, 1104 and 1106 may be adjusted until the calculated illumination is closest to the baseline illumination. Once the closest illumination to the baseline illumination is found, the values of the corresponding parameters for the closest calculated illumination are saved (i.e., the full acquisition path 310 is generated by repeating the lace 320 along a first lead line 340 inside the first lane 321 and along a second lead line 342 inside the second lane 321' and replicating the first and second lanes until the entire survey area is covered with laces) and, if necessary, the full acquisition path is transmitted in step 1110 to the vessel(s) participating in the seismic survey for implementation. Then, in step 1112, the vessel(s) acquires the seismic data by following the selected full acquisition path and in step 1114 the collected seismic data is processed to generate an image of the surveyed area. This image is then used by the oil and gas companies to decide where to drill for extracting the underground resources.

Figure 12:
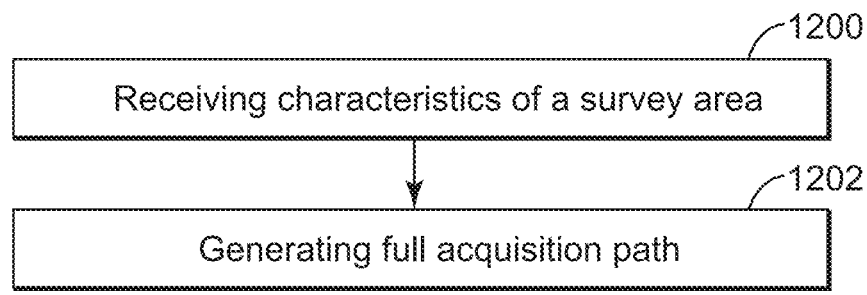
FIG. 12 is another flow-chart of a method for generating a pre-plot for a seismic survey.

According to another embodiment, FIG. 12 illustrates a method for generating a full acquisition path for a seismic survey. The method includes a step 1200 of receiving characteristics of a survey area (350) to be survey, and a step 1202 of generating the full acquisition path by replicating a lace (320) along overlapping lanes (321, 321'), where the overlapping lanes cover the entire survey area. The full acquisition path includes a set of straight lines and a set of coils.

Figure 13:
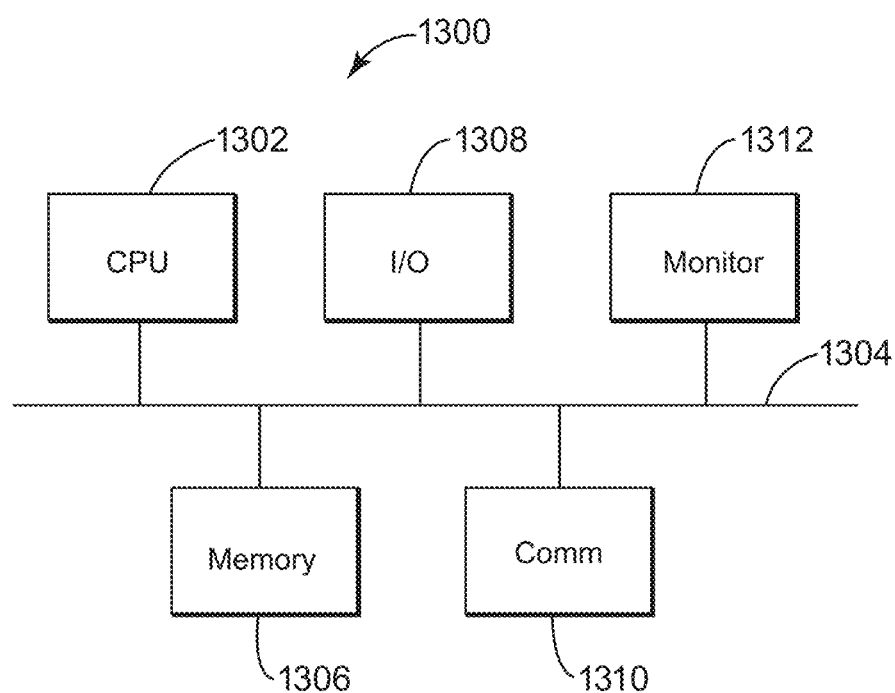
FIG. 13 is a schematic illustration of a computing device to implement various methods described herein.

The methods and algorithms discussed above may be implemented in a computing device 1300 as illustrated in FIG. 13. The computing device 1300 may be the vessel's navigation system and it may include a processor 1302, a computer, a server, etc. connected through a bus 1304 to a storage device 1306. The storage device 1306 may be any type of memory and may store necessary commands and instructions associated with positioning the sources and the streamer spreads as discussed above. Also connected to the bus 1304 is an input/output interface 1308 through which the operator may interact with the vessels. A communication interface 1310 is also connected to the bus 1304 and is configured to transfer information between the processor 1302 and an outside network, Internet, operator's internal network, etc. The communication interface 1310 may be wired or wireless. Optionally, computing device 1300 may include a screen 1312 for displaying various results generated by the algorithms discussed above. For example, the positions of the vessels along various laces may be displayed on the screen 1312.

The above-disclosed embodiments provide a system and a method for improving an azimuth and/or offset distribution for a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating a full acquisition path for a marine seismic acquisition system, the method comprising:
    receiving survey area information about a survey area to be seismically surveyed;
    selecting a radius (R) and a length (L) of a lace;
    selecting an overlap distance (OL) between first and second lanes;
    generating the full acquisition path by repeating the lace along a first lead line inside the first lane and along a second lead line inside the second lane and replicating the first and second lanes until the entire survey area is covered with laces; and
    sending the full acquisition path to a streamer vessel for performing the seismic survey.

2. The method of claim 1, wherein the first lane is obtained by repeating the lace along the first lead line and then repeating the lace along the first lead line, in an opposite direction, with a given shift S.

3. The method of claim 1, wherein the overlap distance (OL) is between three and four radiuses (R).

4. The method of claim 1, wherein the survey area information includes a length and a width of the survey area.

5. The method of claim 1, wherein the lace includes two straight line portions and two curved portions.

6. The method of claim 1, wherein the lace includes a first straight line portion, which is connected to a first curved portion, which is connected to a second straight line portion, which is connected to a second curved portion.

7. The method of claim 6, wherein the second curved portion is connected to a straight line portion of a next lace.

8. The method of claim 1, wherein two adjacent laces are superposed inside a given lane.

9. The method of claim 1, wherein two laces from different lanes are superimposed.

10. The method of claim 1, wherein the full acquisition path is made of a set of straight lines and a set of coils.

11. The method of claim 10, wherein the set of coils include coils that overlap in top of each other.

12. A marine acquisition system for collecting seismic data, the system comprising:
    a first streamer vessel;
    a source towed by the first streamer vessel and configured to generate seismic waves;
    a streamer spread towed by the first streamer vessel and configured to collect the seismic data generated by the seismic waves; and
    a navigation system located on the first streamer vessel and configured to control the first streamer vessel to follow a first full acquisition path over a survey area,
    wherein the first full acquisition path includes plural laces connected to each other, each lace being defined by a radius (R) and a length (L).

13. The system of claim 12, wherein the laces follow a first lead line, and the laces along the first lead line define a first lane.

14. The system of claim 13, wherein further laces follow a second lead line and the further laces define a second lane.

15. The system of claim 14, wherein the first lane overlaps over the second lane.

16. The system of claim 13, wherein the first lead line is curved.

17. The system of claim 12, further comprising:
    a second streamer vessel that follows a second full acquisition path that mirrors the first full acquisition path,
    wherein the second full acquisition path is offset relative to the first full acquisition path.

18. The system of claim 17, wherein there is an inline offset between the first and second streamer vessels which is controlled for improving a source-receiver distribution and/or an azimuth distribution.

19. A method for generating a full acquisition path for a seismic survey, the method comprising:
- receiving characteristics of a survey area to be surveyed; and
- generating the full acquisition path by replicating a lace along overlapping lanes, where the overlapping lanes cover the entire survey area, each lace defined by a radius (R) and a length (L),
- wherein the full acquisition path includes a set of straight lines and a set of coils.

20. The method of claim 19, wherein the straight lines are substantially perpendicular to each other and the coils overlap with each other.

\* \* \* \* \*